L. E. WILCOX.
LIFTING JACK.
APPLICATION FILED MAR. 5, 1919.
1,314,451.
Patented Aug. 26, 1919.
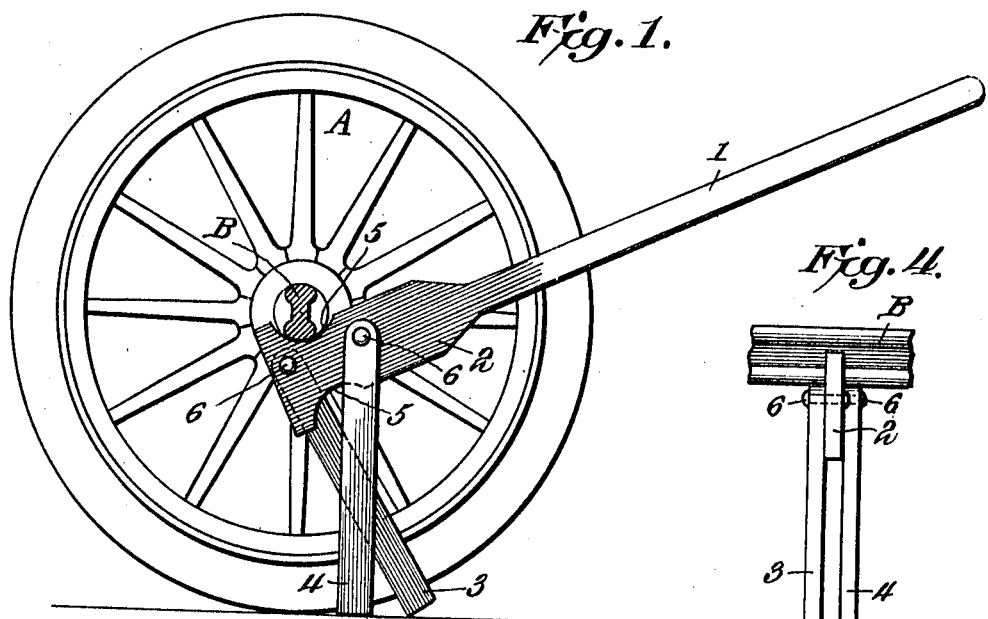
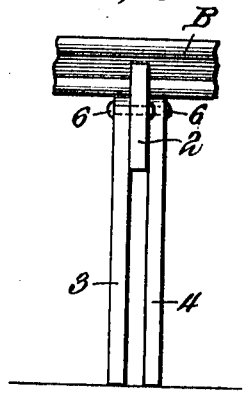
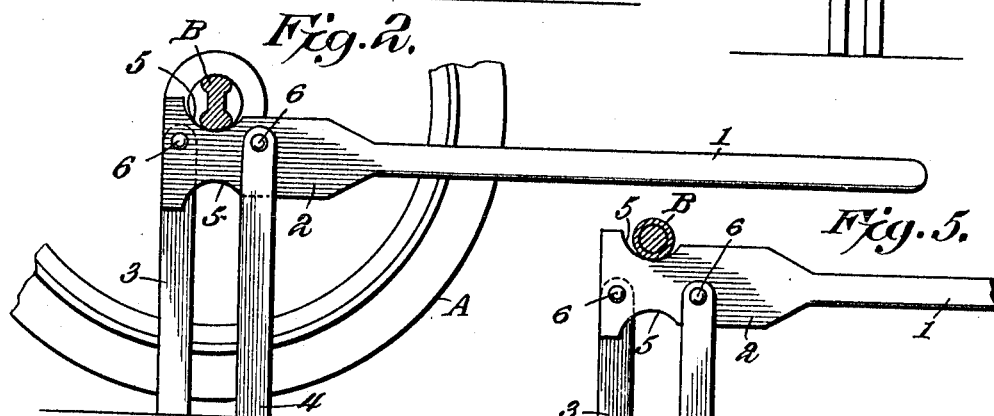
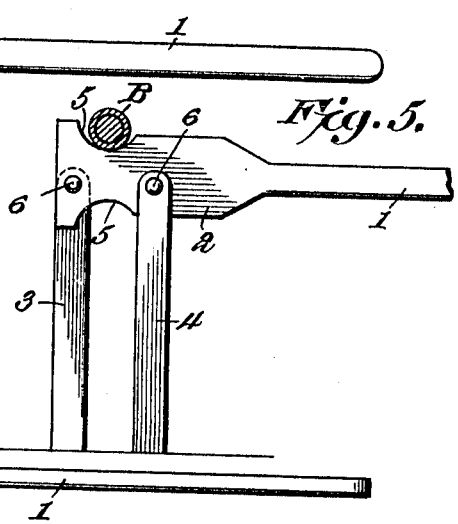
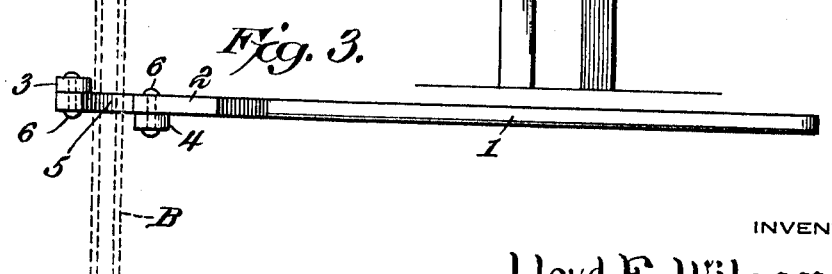
INVENTOR
Lloyd E. Wilcox
BY
ATTORNEY

UNITED STATES PATENT OFFICE.

LLOYD E. WILCOX, OF GREEN, KANSAS.

LIFTING-JACK.

1,314,451.  Specification of Letters Patent.  Patented Aug. 26, 1919.

Application filed March 5, 1919. Serial No. 280,709.

*To all whom it may concern:*

Be it known that I, LLOYD E. WILCOX, a citizen of the United States, residing in the city of Green, in the county of Clay and State of Kansas, have invented certain new and useful Improvements in Lifting-Jacks, of which the following is a specification, reference being had to the accompanying drawings, which form a part hereof.

My invention relates to jacks for lifting vehicles and holding them in raised position while being repaired or otherwise operated upon and the objects are to provide a simple, compact, durable and efficient jack for the purpose mentioned and particularly as applied to the raising of motor vehicles when it is desired to change tires or do other work where a lifting jack may be useful.

I attain these objects by means of the construction hereinafter described and illustrated in the accompanying drawing; in which,—

Figure 1 is a side elevation as it appears in position preliminary to the raising of a wheel of a motor vehicle;

Fig. 2 is a side elevation thereof as it appears when the wheel is raised to the desired position;

Fig. 3 is a top view of my improved jack;

Fig. 4 is an end view thereof with a section of an axle in raised position; and

Fig. 5, a side elevation of my invention reversed for raising a higher object.

Similar numerals of reference indicate like parts throughout the several views.

A represents the wheel of a motor vehicle and B the axle.

My invention consists of the handle 1, body 2 and standards 3 and 4. For strength the body 2 is broadened. Across each edge thereof a groove or notch 5 is provided as a bearing for the object to be raised. Lever 1—2 is fulcrumed on pivot-pin 6 nearer to the handle 1. The standards 3 and 4 are pivoted approximately an inch off of the longitudinal middle line of the lever so that in one position it will serve to raise the front axle and when reversed it will take up the difference in height between front and rear axles. The standards are disposed one on each side of groove 5 to centralize the bearing and avoid tipping.

In using my jack it is so placed beneath the axle or object to be raised that the axle rests within one of the grooves 5 at a point to one side thereof with one standard resting in a vertical position on the surface of the ground or floor. Then by depressing the handle of the lever the object is raised till the other standard assumes a vertical position and the axle or other object has slipped to the bottom of the groove.

To lower the object and remove the jack the handle of the lever is raised till one standard is free from the ground, the center of gravity being changed the object naturally falls.

Jacks may be constructed for lifting vehicles or other objects of different height by substituting longer or shorter standards as the particular object may require by attaching them to the same or an independent lever.

Some of the advantages of my improved jack are:—Its simple construction and operation; its compactness; and it being all together as one article is always ready for use and there is no danger of overlooking or mislaying any part of it.

Having thus described my invention what I claim as new and desire to secure by Letters Patent is,—

1. A lifting jack comprising a lever having a notch near its end to receive the object to be lifted, and a pair of standards of substantially the same length pivoted at one end to opposite sides of the lever adjacent and at substantially equal distances from said notch.

2. A lifting jack comprising a reversible lever having a relatively wide portion adapted to engage the object to be lifted, and a pair of spaced standards pivoted at their ends to such wide portion of said lever and capable of complete rotation on such pivots, said standards being connected to said lever at points to one side of the longitudinal axis thereof.

LLOYD E. WILCOX.

Witnessed by—
 Roy SMITH,
 P. SMEE.

Copies of this patent may be obtained for five cents each, by addressing the "Commissioner of Patents, Washington, D. C."